United States Patent
Myers, Jr. et al.

(10) Patent No.: US 6,955,040 B1
(45) Date of Patent: Oct. 18, 2005

(54) CONTROLLED PRESSURE FUEL NOZZLE INJECTOR

(75) Inventors: William Joseph Myers, Jr., West Chester, OH (US); Thomas Vander Ng, West Chester, OH (US); Alfred Albert Mancini, Cincinnati, OH (US); James Neil Cooper, Hamiltion, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/814,488

(22) Filed: Mar. 31, 2004

(51) Int. Cl.[7] .............................................. F02C 7/232
(52) U.S. Cl. ...................... 60/39.281; 60/741; 60/742
(58) Field of Search ............................ 60/734, 39.281, 60/740, 741, 742

(56) References Cited

U.S. PATENT DOCUMENTS

| | | | |
|---|---|---|---|
| 5,261,222 A | 11/1993 | Napoli | |
| 5,289,685 A | 3/1994 | Hoffa | |
| 5,321,949 A | 6/1994 | Napoli et al. | |
| 5,442,922 A | 8/1995 | Dyer et al. | |
| 5,598,696 A * | 2/1997 | Stotts | 60/779 |
| 5,881,550 A | 3/1999 | Toelle | |
| 6,405,524 B1 | 6/2002 | Mistry et al. | |
| 6,474,070 B1 | 11/2002 | Danis et al. | |
| 6,523,350 B1 | 2/2003 | Mancini et al. | |
| 2002/0002818 A1 | 1/2002 | Badeer | |
| 2002/0038540 A1 | 4/2002 | Griffiths et al. | |
| 2003/0221429 A1 | 12/2003 | Laing et al. | |

* cited by examiner

Primary Examiner—Ehud Gartenberg
(74) Attorney, Agent, or Firm—William Scott Andes; Steven J. Rosen

(57) ABSTRACT

A multi-staged gas turbine engine fuel supply fuel injector includes at least first and second staged fuel injection circuits having first and second fuel injection points. At least first and second fuel nozzle valves operable to open at different first and second crack open pressures are controllably connected to the first and second staged fuel injection circuits, respectively. A single fuel supply manifold is connected to all of the fuel nozzle valves. A single fuel signal manifold is controllably connected to all of the first and second fuel nozzle valves. The fuel injector includes a valve housing containing the fuel nozzle valves.

17 Claims, 14 Drawing Sheets

CONTROLLED PRESSURE FUEL NOZZLE INJECTOR

BACKGROUND OF THE INVENTION

1. Field of the Invention

The present invention relates generally to gas turbine engine combustor fuel injectors and, more particularly, such fuel injectors for use in staged fuel supply systems.

In order to lower emissions, gas turbine engines are using lean burning combustors which require turning on and off independent fuel circuits over a range of operating conditions including engine power level and environmental conditions. This is often referred to as fuel staging and is required to keep a local fuel/air ratio of the engine within a narrow range defined at its upper limit by NOx emissions and at its lower limit by a flame-out boundary.

Current engines use multiple individually controlled centralized staging valves with multiple fuel supply manifolds which deliver fuel to the fuel nozzles. There is one fuel supply manifold for each stage, thus, each fuel nozzle has multiple fuel supply connections, one for each stage. In order to prevent coking, fuel must be either drained from or continuously circulated in the unstaged manifold. These multi-manifold fuel systems are cumbersome and require many looped or bent fuel supply tubes of multiple shapes and sizes to feed the differential staged fuel nozzles. It is desirable to have a fuel system with a single fuel manifold and a fuel injector containing the differential staged fuel nozzles.

Fuel systems with multiple centralized staging valves are expensive and engine designers are always striving to build more reliable fuel systems with better operability response. Centralized staging fuel systems exhibit droop in speed during acceleration because unstaged fuel manifolds in such systems must be pressurized and empty volumes filled before fuel flow is attained in the circuit. It is highly desirable to reduce speed droop.

Fuel injectors, such as in gas turbine engines, direct pressurized fuel from a manifold to one or more combustion chambers. Fuel injectors also prepare the fuel for mixing with air prior to combustion. Each injector typically has an inlet fitting connected to the manifold, a tubular extension or stem connected at one end to the fitting, and one or more spray nozzles connected to the other end of the stem for directing the fuel into the combustion chamber. A fuel conduit or passage (e.g., a tube, pipe, or cylindrical passage) extends through the stem to supply the fuel from the inlet fitting to the nozzle. Appropriate valves and/or flow dividers can be provided to direct and control the flow of fuel through the nozzle. The fuel injectors are often placed in an evenly-spaced annular arrangement to dispense (spray) fuel in a uniform manner into the combustor chamber.

2. Brief Description of the Invention

A multi-staged gas turbine engine fuel supply system fuel injector includes at least first and second staged fuel injection circuits. Each of the first and second staged fuel injection circuits has first and second fuel injection points and at least first and second fuel nozzle valves controllably connected to the first and second staged fuel injection circuits, respectively. The first and second fuel nozzle valves are operable to open at different first and second crack open pressures, respectively. The first and second fuel nozzle valves are located in a valve housing of the injector which includes a single fuel supply connector connected in fuel supply relationship with the first and second fuel nozzle valves and a single fuel signal connector connected in pressure supply relationship with the first and second fuel nozzle valves.

In one embodiment of the fuel injectors, the first fuel injection points of the first staged fuel injection circuits are tip orifices in a fuel injector tips of pilot nozzles of the fuel injectors. The second fuel injection points of the second staged fuel injection circuits are spray orifices in main nozzles of the fuel injectors. The system may further include third staged fuel injection circuits having third fuel injection points in the fuel injectors. The third fuel injection points may also be in the main nozzles of the fuel injectors.

DETAILED DESCRIPTION OF THE INVENTION

Figure 1:
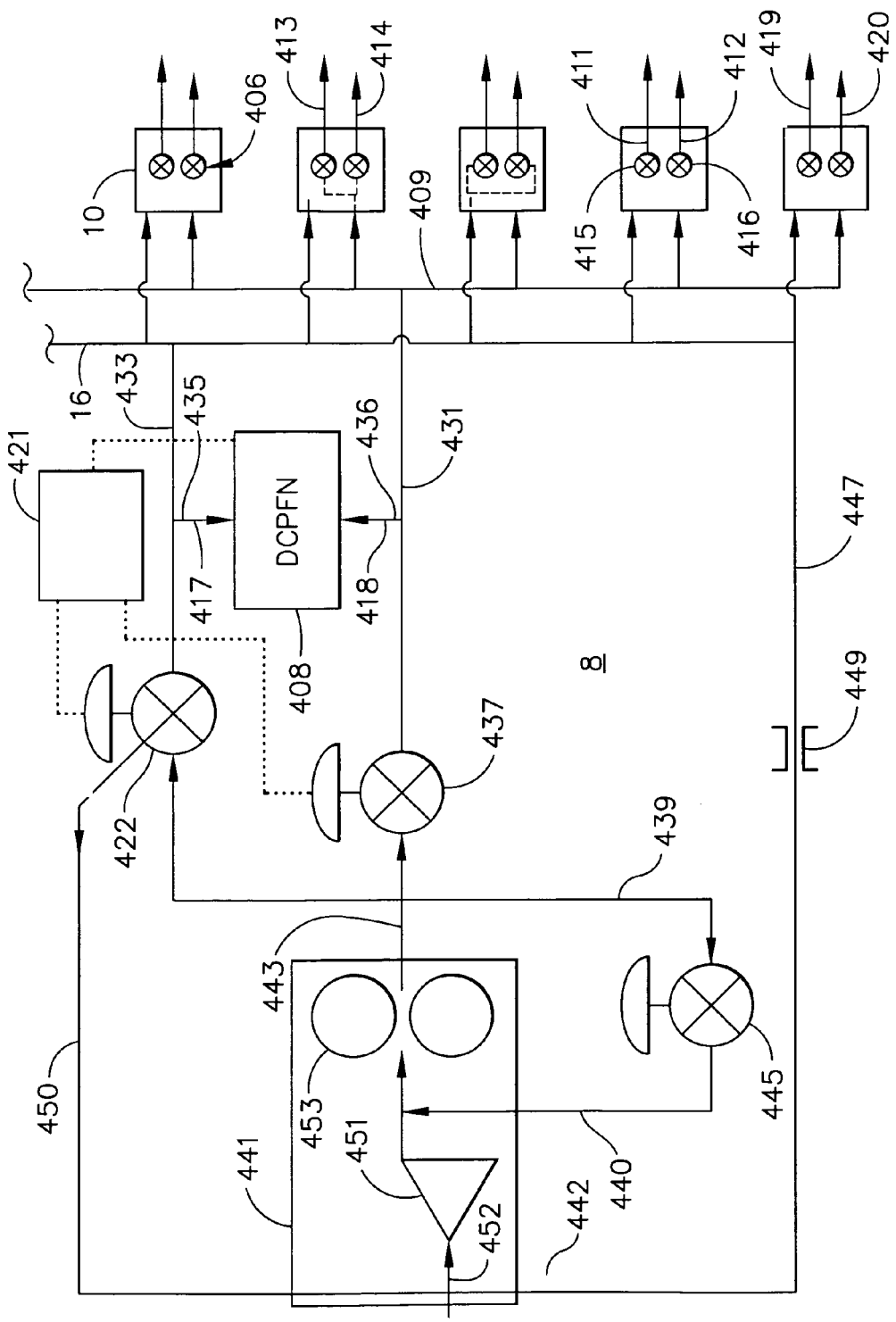
FIG. 1 is a schematical view illustration of a multi-staged gas turbine engine fuel supply system with only a single fuel supply manifold and only a single fuel signal manifold.

Schematically illustrated in FIG. 1 is an exemplary embodiment of a multi-staged gas turbine engine fuel supply system 8 that provides fuel to first and second staged fuel injection circuits 411 and 412 of each of a plurality of fuel injectors 10. Each of the first and second staged fuel injection circuits 411 and 412 has first and second fuel injection points 413 and 414. First and second fuel nozzle valves 415 and 416 are controllably connected to the first and second staged fuel injection circuits 411 and 412, respectively. A fuel supply circuit 431 includes a single fuel supply manifold 409 connected in fuel supplying relationship to all of the fuel nozzle valves 415 and 416. The first and second fuel nozzle valves 415 and 416 are operable to open at different first and second crack open pressures 419 and 420, respectively, as indicated by the different arrow lengths representing the different crack open pressures. All of the first and second fuel nozzle valves 415 and 416 are controllably connected to a single fuel signal manifold 16 in a signal circuit 433.

Figure 2:
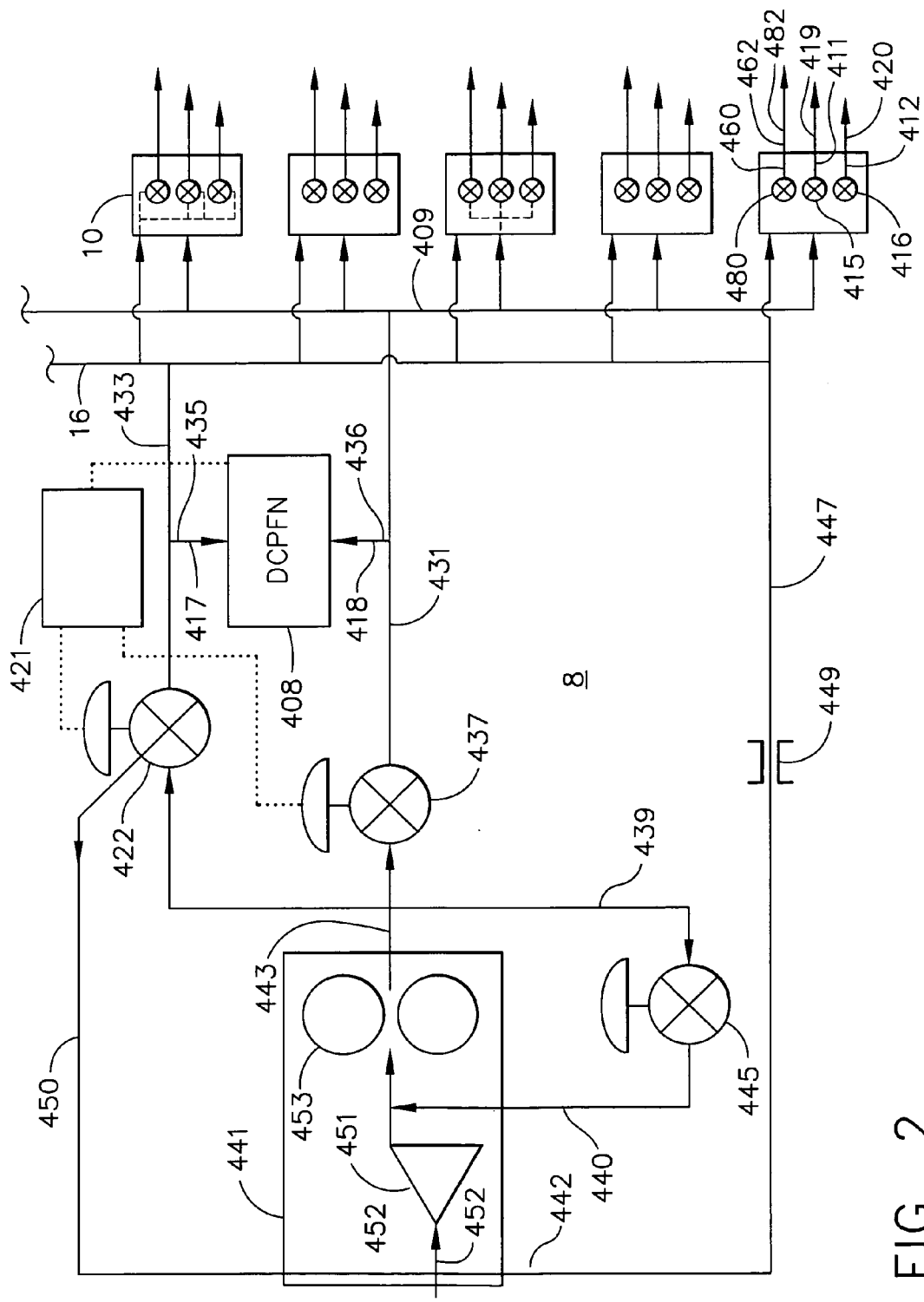
FIG. 2 is a schematical view illustration of a three stage gas turbine engine fuel supply system with only a single fuel supply manifold and only a single fuel signal manifold.
Figure 5:
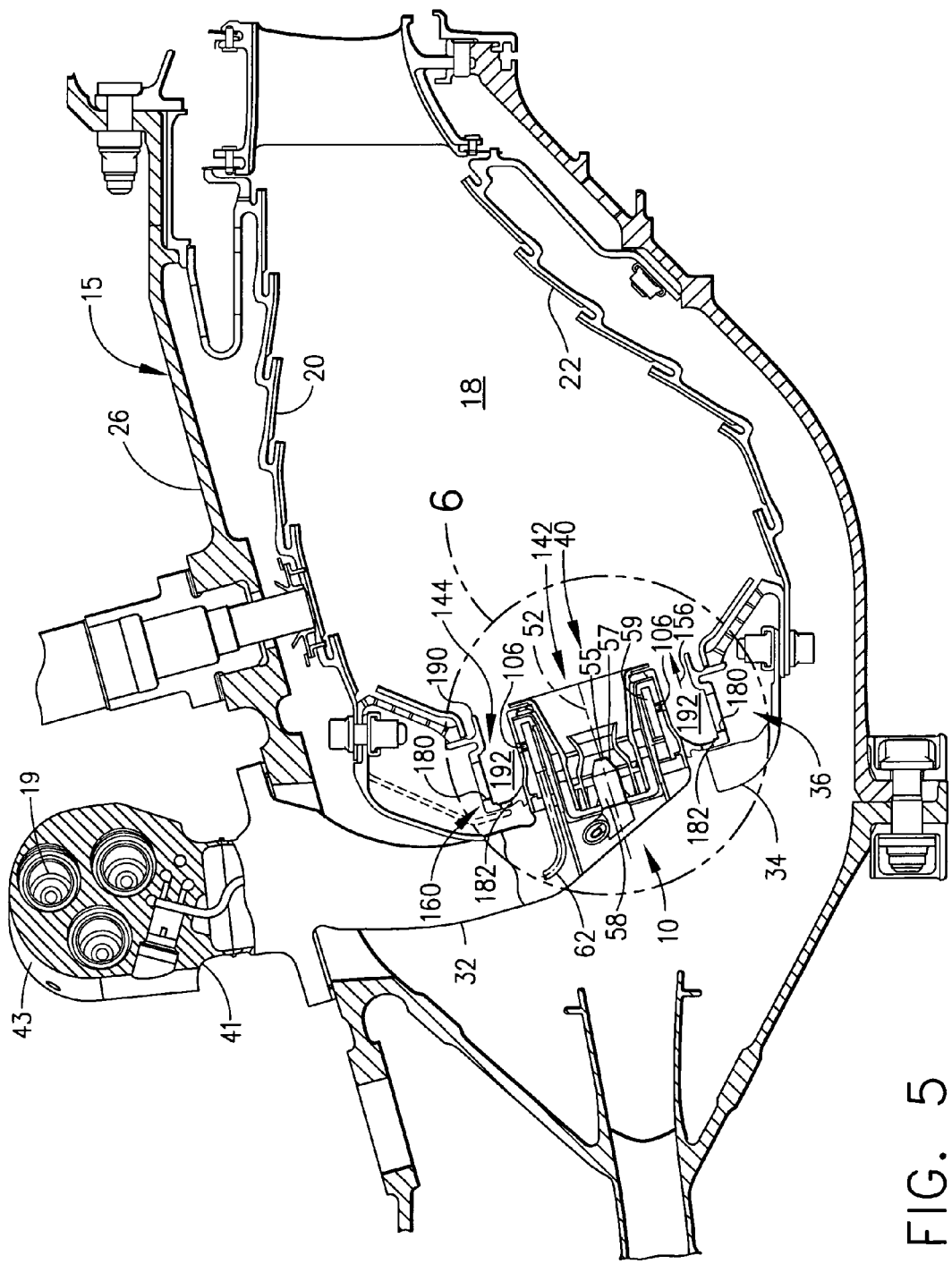
FIG. 5 is a cross-sectional view illustration of a gas turbine engine combustor with an exemplary embodiment of a triple staged fuel injector.
Figure 7:
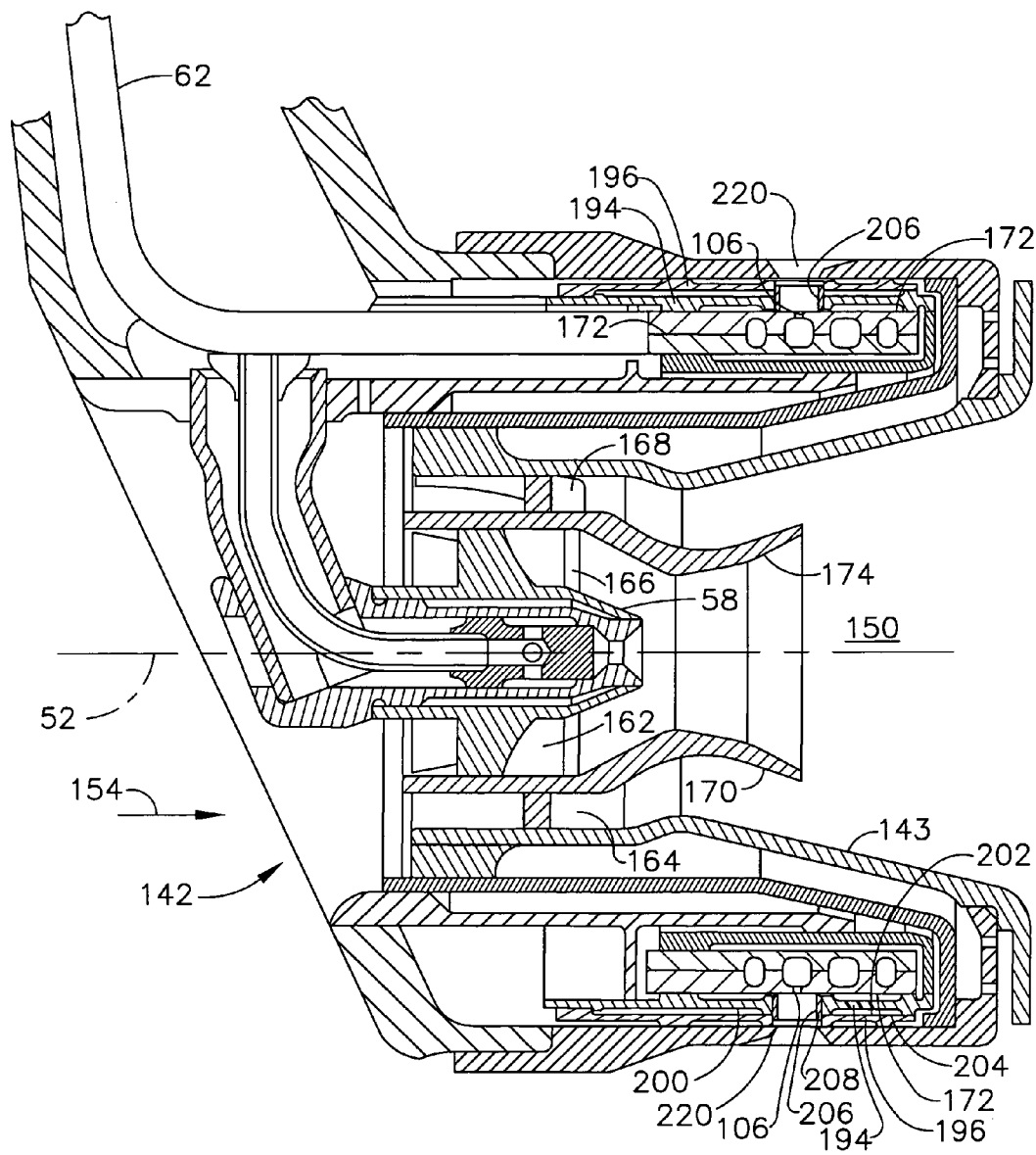
FIG. 7 is an enlarged cross-sectional view illustration of the fuel nozzle assembly illustrated in FIG. 6.

A more particular exemplary embodiment of the fuel injectors 10 illustrated in FIG. 1 includes the first fuel injection points 413 of the first staged fuel injection circuits 411 being tip orifices 55 in a fuel injector tips 57 of pilot nozzles 58 of the fuel injectors 10 as illustrated in FIGS. 5 and 7. The second fuel injection points 414 of the second staged fuel injection circuits 412 are spray orifices 106 in main nozzles 59 of the fuel injectors 10 illustrated in FIGS. 5 and 7. The system 8 may further include third staged fuel injection circuits 460 having third fuel injection points 462 in the fuel injectors 10 as illustrated in FIG. 2. Third fuel nozzle valves 480 having third crack open pressures 482 are in the third staged fuel injection circuits 460. The system may have more than three staged fuel injection circuits 460 and more than three staged fuel injection points 462 in the fuel injectors 10.

The exemplary embodiments of the system 8 illustrated in FIGS. 1 and 2 further includes a differential pressure measuring means 418 for sensing a differential pressure DCPFN between a signal pressure 417 of the signal circuit 433 and a fuel supply pressure 427 of the fuel supply circuit 431. A fuel controller 421 in feedback signal relationship to the differential pressure measuring means 418 controls a pressure regulator 422 controllably connected to the fuel controller 421. The fuel controller 421 by controlling the pressure regulator 422 controls and regulates pressure through the signal circuit 433 and, thus, controls the crack open pressures sent to the fuel nozzle valves from the single fuel signal manifold 16 in the signal circuit 433. The first fuel nozzle valves 415 open and remain open when the pressure in the signal circuit 433 equals or exceeds the first crack open pressure 419. The second fuel nozzle valves 416 open and remain open when the pressure in the signal circuit 433 equals or exceeds the second crack open pressures 420. This eliminates the need for multiple fuel and signal lines to each injector for each stage.

A fuel pump 441 is connected in fuel supplying relationship to a fuel metering valve 437 which is connected in fuel supplying relationship to the fuel supply manifold 409. The fuel metering valve 437 is controllably connected to the fuel controller 421. A first pressure input line 435 leads from between the pressure regulator 422 and the signal circuit 433 to the differential pressure measuring means 418. A second pressure input line 436 leads from a point in the fuel supply circuit 431 between the fuel metering valve 437 and the fuel supply manifold 409 to the differential pressure measuring means 418. The differential pressure measuring means 418 is typically a pressure transducer. The pressure transducer may be mechanical or electrical.

The fuel pump 441 has a pump outlet 443 connected in fuel pressure supplying relationship to the pressure regulator 422 and also connected in fuel supplying relationship to the fuel metering valve 437. The pressure regulator 422 is also connected in fuel pressure sink relationship by a pressure regulator return line 450 to a booster pump inlet 452 to the booster pump 451 for use during transient conditions or operations. The pressure regulator 422 is a three way servo and is operable to open up the pressure regulator return line 452 when the pressure regulator 422 is set to a closed or off position. Note that a closed or off position does not fully shut off flow through to the fuel signal manifold 16. A pump bypass line 439 leads from the pump outlet 443 to a pump bypass line inlet 440 to the fuel pump 441 and has a bypass valve 445 therein. A signal fuel return line 447 leads from the fuel signal manifold 16 to a signal fuel return inlet 442 to the fuel pump 441. A return line orifice 449 is disposed in the signal fuel return line 447. The return line orifice 449 allows fuel to keep flowing in the signal manifold 409 and avoid coking in the nozzles and lowers pressure gain across the pressure regulator 422 during engine operation. The fuel pump 441 includes a booster pump 451 upstream of and in serial flow relationship to a main pump 453. The pump bypass line inlet 440 is disposed between the booster and main pumps 451 and 453. The signal fuel return line 447 leads from the fuel signal manifold 16 to the signal fuel return inlet 442 to the fuel pump 441 at the booster pump inlet 452 to the booster pump 451.

Figure 3:
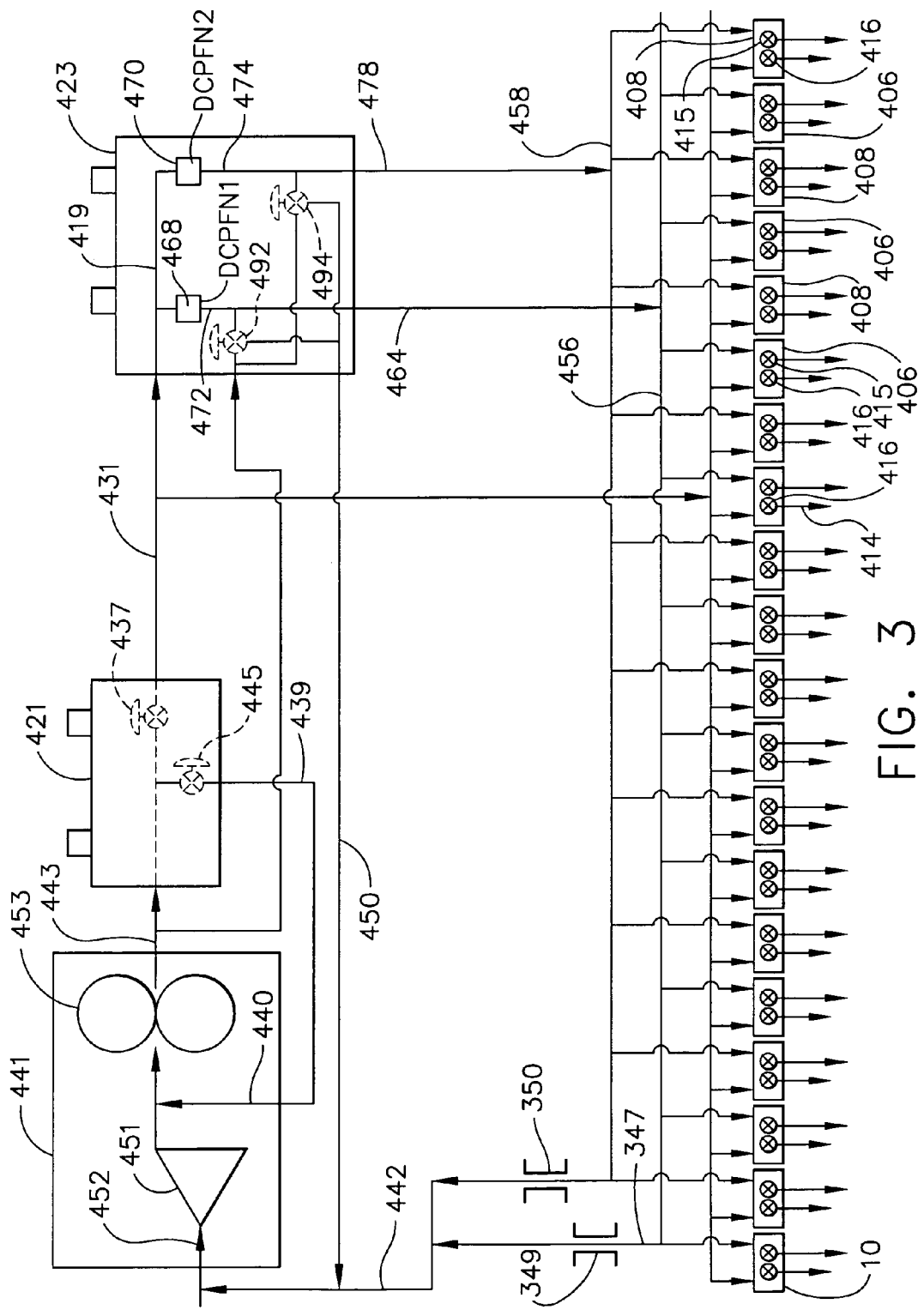
FIG. 3 is a schematical view illustration of a gas turbine engine fuel supply system with dual two stage fuel injectors with only a single fuel supply manifold.
Figure 4:
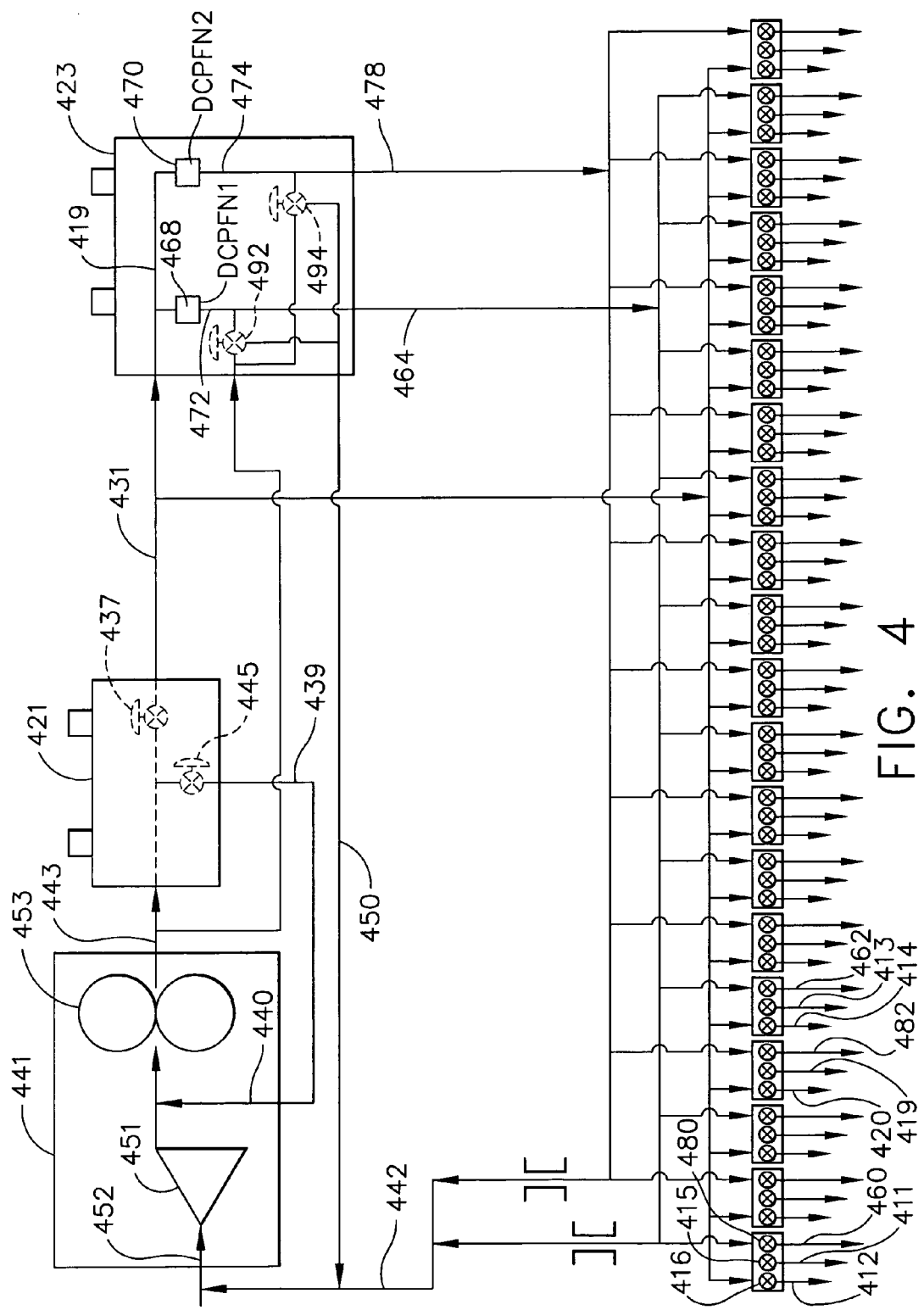
FIG. 4 is a schematical view illustration of a gas turbine engine fuel supply system with dual three stage fuel injectors with only a single fuel supply manifold.

Schematically illustrated in FIGS. 3 and 4 are exemplary embodiments of a multi-staged gas turbine engine controlled pressure fuel supply system 8 that has two or more pluralities of staged fuel injectors 10. The system 8 is illustrated for providing fuel to first and second staged fuel injection circuits 411 and 412 of each of first and second pluralities 406 and 408, respectively, of fuel injectors 10. Each of the first and second pluralities, or more if so provided, may be turned on or off with the other or others turned on. This may be used for circumferential staging. The system 8 illustrated in FIG. 3 is for a double two stage system and the system 8 illustrated in FIG. 4 is for a double three stage system. The fuel supply circuit 431 for both the double two and three stage systems includes a single fuel supply manifold 409 connected in fuel supplying relationship to all of the fuel nozzle valves 415 and 416 for the first and second fuel injection points 413 and 414 of both the first and second pluralities 406 and 408 of the fuel injectors 10 as illustrated in FIGS. 3 and 4. Fuel injectors 10 of the first plurality 406 are interdigitated with fuel injectors 10 of the second plurality 408 such that circumferentially adjacent fuel injectors 10 are from different ones of the first and second pluralities 406 and 408 of the fuel injectors 10.

The first and second fuel nozzle valves 415 and 416 are operable to open at different first and second crack open pressures 419 and 420, respectively, as indicated by the different arrow lengths representing the different crack open pressures in the double two stage system illustrated in FIG. 3. Crack open pressures of the first and second fuel nozzle valves 415 and 416 may be the same or different for the first and second pluralities 406 and 408 of the fuel injectors 10. Alternatively, scheduling the opening and closing of the first and second fuel nozzle valves 415 and 416 may be the same or different for the first and second pluralities 406 and 408.

The first and second fuel nozzle valves 415 and 416 for the first plurality 406 of fuel injectors 10 are controllingly connected in fuel supply relationship to the first and second fuel injection points 413 and 414, respectively, in the first plurality 406 of fuel injectors 10. The first and second fuel nozzle valves 415 and 416 of the first plurality 406 of fuel injectors 10 are controllably connected to a first fuel signal manifold 456 in a first signal circuit 464 for the first plurality 406 of fuel injectors 10. The first and second fuel nozzle valves 415 and 416 of the second plurality 408 of fuel injectors 10 are controllingly connected in fuel supply relationship to the first and second fuel injection points 413 and 414 respectively in the second plurality 408 of fuel injectors 10. The first and second fuel nozzle valves 415 and 416 for the second plurality 408 of fuel injectors 10 are controllably connected to a second fuel signal manifold 458 in a second signal circuit 478 of the second plurality 408 of fuel injectors 10. The fuel pump 441 is connected in fuel supplying relationship to a fuel metering valve 437 which is connected in fuel supplying relationship to the fuel supply manifold 409. The fuel metering valve 437 of this embodiment located within and controlled by the fuel controller 421. The fuel controller 421 also contains and controls the bypass valve 445 in the pump bypass line 439 leading from the pump outlet 443 to the pump bypass line inlet 440 to the fuel pump 441. First and second signal fuel return lines 347 and 348 leads from the first and second fuel signal manifold 456 and 458, respectively, to the signal fuel return inlet 442 to the fuel pump 441. First and second return line orifices 349 and 350 are disposed in the first and second signal fuel return lines 347 and 348, respectively.

The system 8 illustrated in FIGS. 3 and 4 further include a first differential pressure measuring means 468 for sensing a first differential pressure DCPFN1 between a first signal pressure 472 of the first signal circuit 464 and a fuel supply pressure 427 of the fuel supply circuit 431. A second differential pressure measuring means 470 is used for sensing a second differential pressure DCPFN2 between a second signal pressure 474 of a second signal circuit 478 and a fuel supply pressure 427 of the fuel supply circuit 431. A fuel nozzle controller 423 is in feedback signal relationship to the first and second differential pressure measuring means 468 and 470 and controls first and second pressure regulators 492 and 494, respectively, which are controllably integrated into the fuel nozzle controller 423. The fuel nozzle controller 423 by controlling the first and second pressure regulators 492 and 494 controls and regulates pressure through the first and second signal circuits 464 and 478 and, thus, controls the pressures sent to the fuel nozzle valves to crack them open and close them. The first fuel nozzle valves 415 open and remain open when the pressure in the signal circuit 433 equals or exceeds the first crack open pressure 419. The second fuel nozzle valves 416 open and remain open when the pressure in the signal circuit 433 equals or exceeds the second crack open pressures 420. The system 8 illustrated in FIG. 4, includes third staged fuel injection circuits 460 having third fuel injection points 462 in the fuel injectors 10. Third fuel nozzle valves 480 having third crack open pressures 482 are in the third staged fuel injection circuits 460. The system may have more than three staged fuel injection circuits 460 and more than three staged fuel injection points 462 in the fuel injectors 10.

Illustrated in FIG. 5 is an exemplary embodiment of a combustor 15 including a combustion zone 18 defined between and by annular, radially outer and radially inner liners 20 and 22, respectively. The outer and inner liners 20 and 22 are located radially inwardly of an annular combustor casing 26 which extends circumferentially around outer and inner liners 20 and 22. The combustor 15 also includes an annular dome 34 mounted upstream from outer and inner liners 20 and 22. The dome 34 defines an upstream end 36 of the combustion zone 18 and a plurality of mixer assemblies 40 (only one is illustrated) are spaced circumferentially around the dome 34. Each mixer assembly 40 helps to support pilot and main nozzles 58 and 59, respectively, of one of the fuel injectors 10. The mixer assemblies 40 together with the pilot and main nozzles deliver a mixture of fuel and air to the combustion zone 18. Each mixer assembly 40 has a nozzle axis 52 about which the pilot and main nozzles 58 and 59 are circumscribed.

Figure 6:
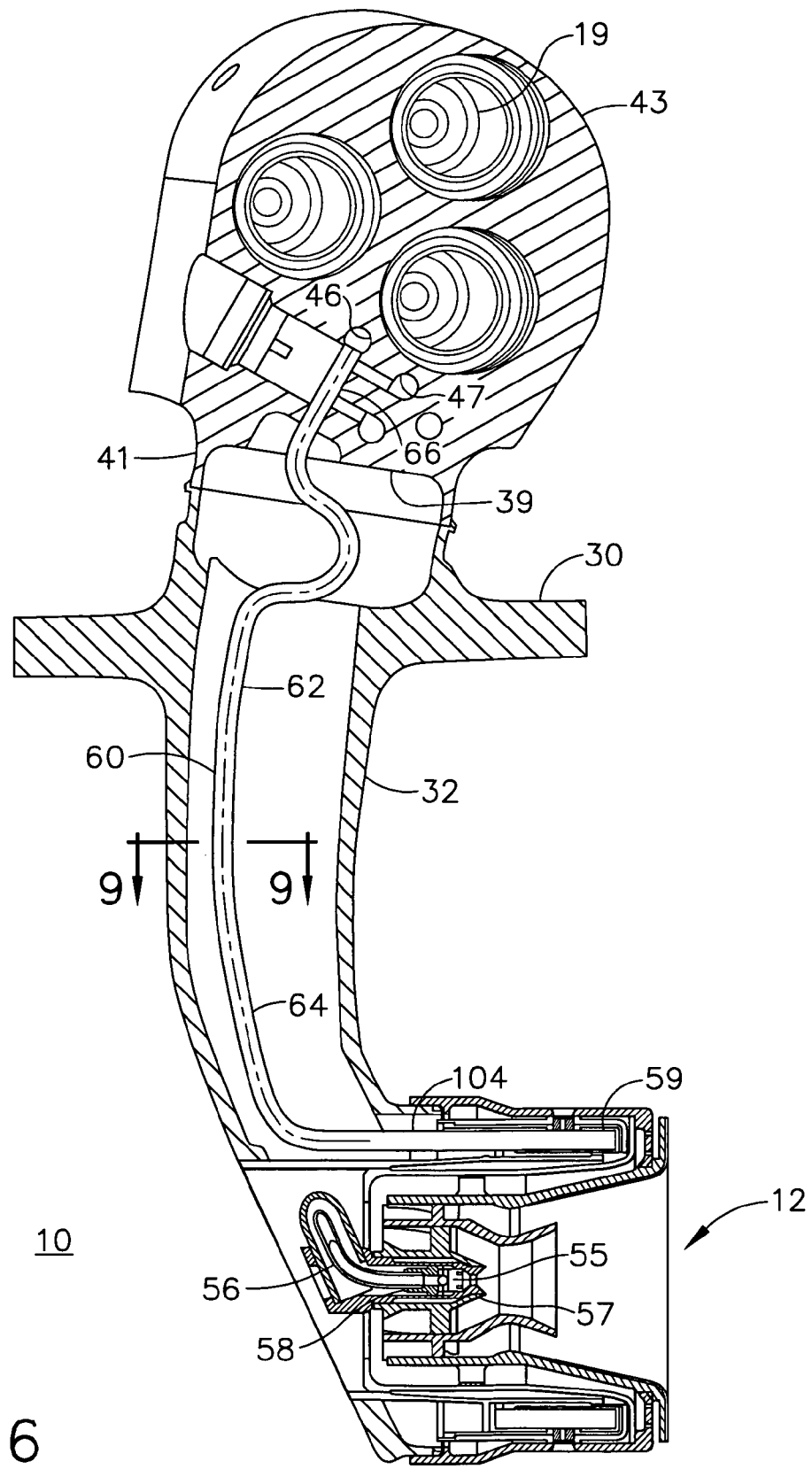
FIG. 6 is an enlarged cross-sectional view illustration of the fuel injector with the fuel nozzle assembly illustrated in FIG. 5.

The exemplary fuel injector 10 illustrated in FIG. 5 has three fuel valve receptacles 19 designed to accommodate the first, second, and third fuel nozzle valves 415, 416, and 480 within a valve housing 43 of the fuel injector 10. The first, second, and third staged fuel injection circuits 411, 412, and 460 are illustrated in FIGS. 5, 6, and 7 more specifically as a pilot fuel circuit 288 for the pilot nozzle 58, and main nozzle first and second fuel circuits 280 and 282 for the main nozzles 59 of the fuel injectors 10, respectively. The first, second, and third fuel nozzle valves 415, 416, and 480 (not illustrated in FIGS. 5–7) controllably supply fuel from the single fuel supply manifold 409 to the pilot fuel circuit 288, the main nozzle first fuel circuit 280 and the main nozzle second fuel circuit 282, respectively. The first fuel injection points 413 of the first staged fuel injection circuits 411 are tip orifices 55 in a fuel injector tips 57 of pilot nozzles 58 of the fuel injectors 10. The second and third fuel injection points 414 and 462 are spray orifices 106 in main nozzle first and second fuel circuits 280 and 282 in the main nozzles 59 of the fuel injectors 10.

Illustrated schematically in FIGS. 13–16 is the operation of a two valve three stage gas turbine engine fuel supply system 8. The first and second fuel nozzle valves 415 and 416 are used to controllably supply fuel to the tip orifices 55 in the fuel injector tips 57 of pilot nozzles 58 and the spray orifices 106 in the main nozzles 59 of the fuel injectors 10, respectively. The second fuel nozzle valve 416 includes a main fuel inlet port 502 connectable in fuel supply relationship to a main fuel outlet port 506 and a supplemental pilot inlet port 500 connectable in fuel supply relationship to a supplemental pilot outlet port 504. A second spool 508 slideably disposed within the second fuel nozzle valve 416 includes upper and lower peripheral passages 509 and 511 around the second spool 508.

The single fuel supply manifold 409 is connected in fuel supply relationship to the main fuel inlet port 502 and the supplemental pilot inlet port 500. The main fuel inlet port 502 is connectable in fuel supply relationship to the main fuel outlet port 506 through the lower peripheral passage 511 around the second spool 508. The supplemental pilot inlet port 500 is connectable in fuel supply relationship to the supplemental pilot outlet port 504 through the upper peripheral passage 509 around the second spool 508. The supplemental pilot inlet port 500 provides a pilot cutback on the second valve 416 to reduce fuel flow to the first valve and subsequently to the pilot nozzles 58. The second spool 508 is biased by a second spring 507 and moved by the differential pressure DCPFN between the signal pressure 417 of the signal circuit 433 and a fuel supply pressure 427 of the fuel supply circuit 431.

A first spool 514 having a third peripheral passage 513 is slideably disposed within the first fuel nozzle valve 415. The first fuel nozzle valve 415 includes a pilot fuel inlet port 510 connectable in fuel supply relationship through the third peripheral passage 513 to a pilot fuel outlet port 512. The single fuel supply manifold 409 and the supplemental pilot outlet port 504 of the second valve 416 are connected in fuel supply relationship to the pilot fuel inlet port 510. The first spool 514 is biased by a first spring 517 and moved by the differential pressure DCPFN between the signal pressure 417 of the signal circuit 433 and a fuel supply pressure 427 of the fuel supply circuit 431. The first and second springs 517 and 507 have different resistances and, hence, provide different crack open pressures for the first and second fuel nozzle valves 415 and 416.

Figure 13:
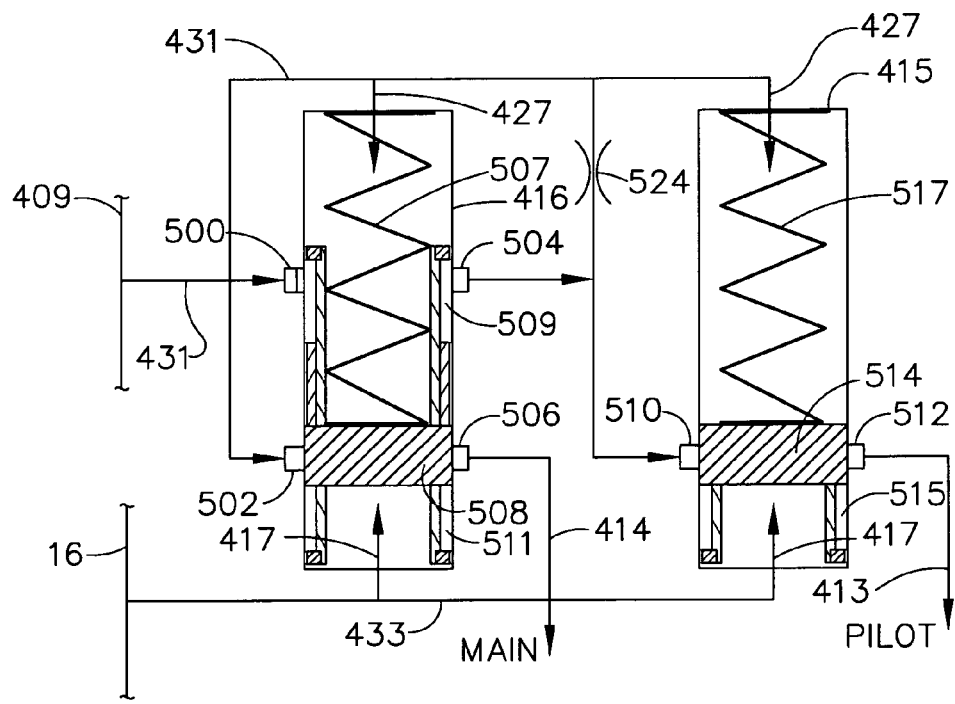
FIGS. 13–16 are schematical view illustrations of two valves illustrating operation of a two valve three stage gas turbine engine fuel supply system for use with only a single fuel supply manifold and only a single fuel signal manifold.

FIG. 13 illustrates both the first and second fuel nozzle valves 415 and 416 in the shutoff position for which the differential pressure DCPFN between the signal pressure 417 of the signal circuit 433 and the fuel supply pressure 427 of the fuel supply circuit 431 is 0. A cutback orifice 524 in the signal circuit 433 between the first fuel nozzle valve 415 and the fuel signal manifold 16 prevents banging or unwanted high pressure oscillations in the signal circuit 433 and the fuel signal manifold 16. The second spool 508 in the second fuel nozzle valve 416 blocks fuel flow through the main fuel inlet port 502 and on to the main nozzle 59. The first spool 514 in the first fuel nozzle valve 415 blocks fuel flow through the pilot fuel inlet port 510 and on to the pilot nozzle 58.

Figure 14:
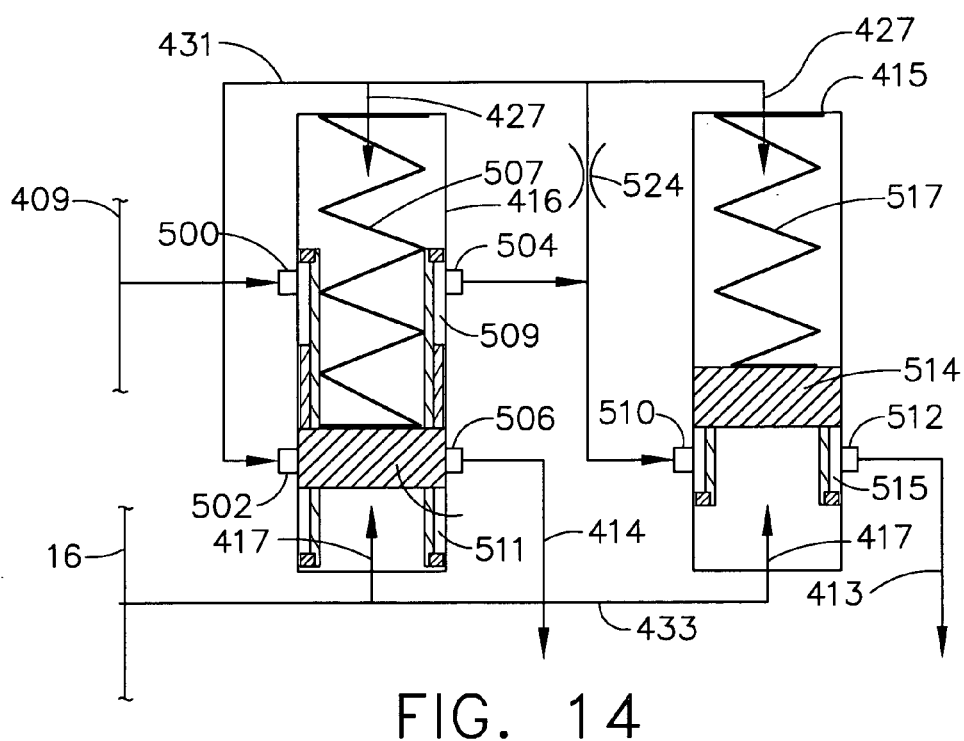

FIG. 14 illustrates the first and second fuel nozzle valves 415 and 416 set for no main nozzle fuel flow to the main nozzle 59 and a relatively high or full pilot fuel flow to the pilot nozzle 58. The second spool 508 is positioned in the second fuel nozzle valve 416 to block fuel flow through the main fuel inlet port 502 and on to the main nozzle 59. This position of the second spool 508 does allow fuel flow through the supplemental pilot inlet port 500, through the peripheral passage 509, around the second spool 508, to the supplemental pilot outlet port 504, and to the pilot nozzle 58. The first spool 514 in the first fuel nozzle valve 415 is positioned to allow fuel flow directly from the single fuel signal manifold 16 through the cutback orifice 524 and from the supplemental pilot outlet port 504 through the pilot fuel inlet port 510 and on to the pilot nozzle 58. This mode or stage of operation provides full fuel flow through the pilot nozzle 58 and no fuel flow through the main nozzle 59.

Figure 15:
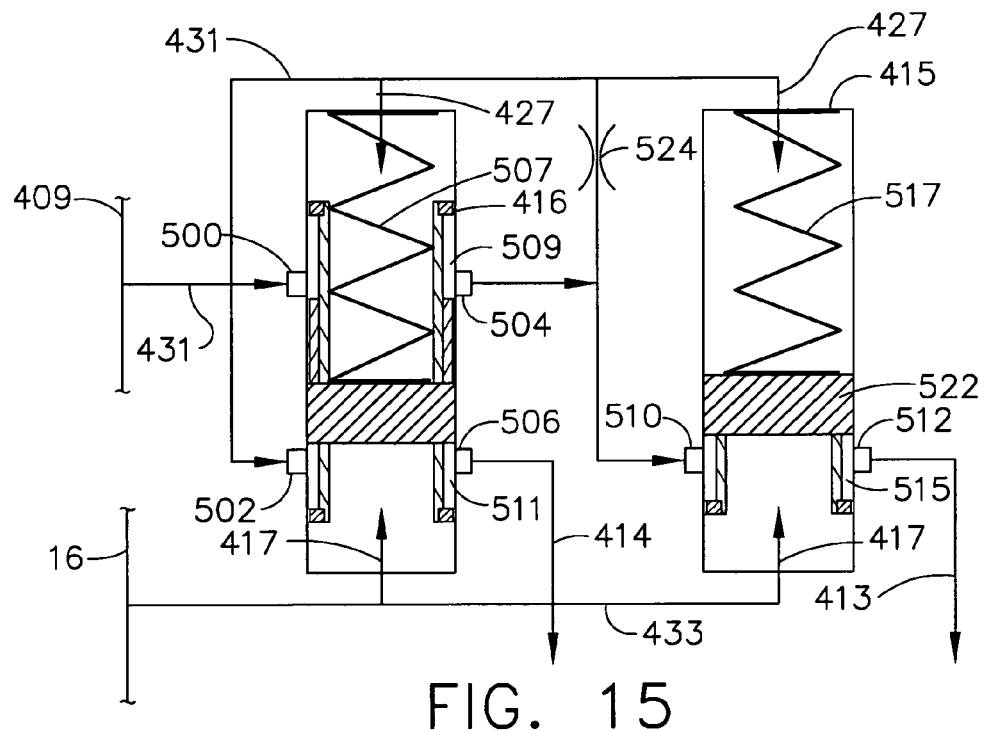

FIG. 15 illustrates the first and second fuel nozzle valves 415 and 416 set for full main nozzle fuel flow to the main nozzle 59 and a relatively high pilot fuel flow to the pilot nozzle 58. The second spool 508 is positioned in the second fuel nozzle valve 416 to allow fuel flow through the main fuel inlet port 502 and on to the main nozzle 59 and through the supplemental pilot inlet port 500, through the peripheral passage 509, around the second spool 508, to the supplemental pilot outlet port 504, and to the pilot nozzle 58. The first spool 514 in the first fuel nozzle valve 415 is positioned to allow fuel flow directly from the single fuel signal manifold 16 through the cutback orifice 524 and from the supplemental pilot outlet port 504 through the pilot fuel inlet port 510 and on to the pilot nozzle 58. This mode or stage of operation provides full fuel flow through the pilot nozzle 58 and full fuel flow through the main nozzle 59.

Figure 16:
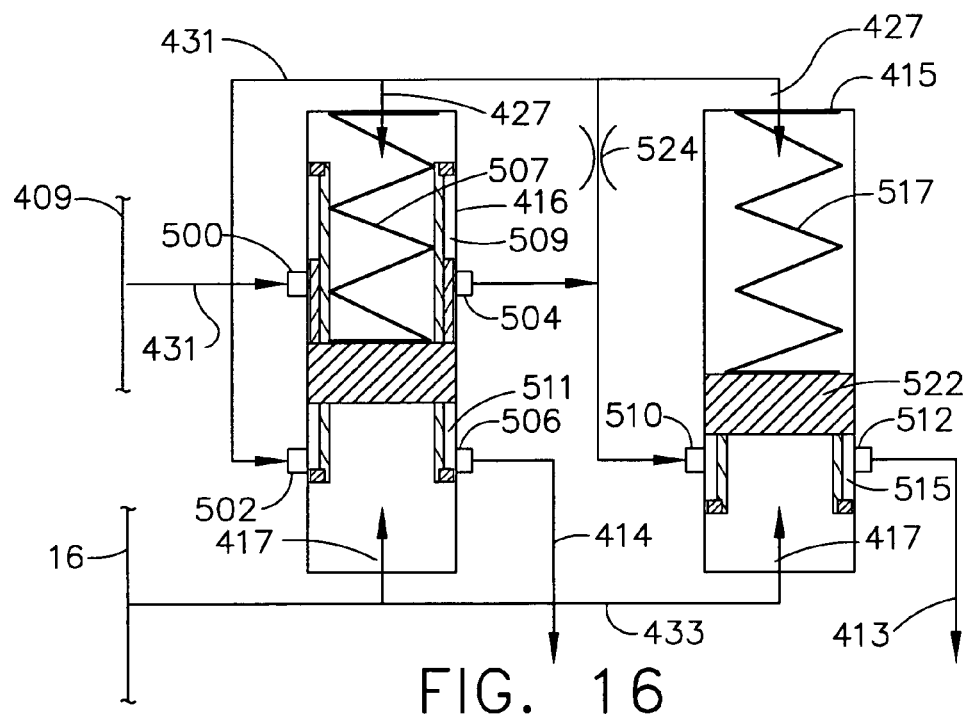

FIG. 16 illustrates the first and second fuel nozzle valves 415 and 416 set for full main nozzle fuel flow to the main nozzle 59 and a relatively low or partial pilot fuel flow to the pilot nozzle 58. This mode also referred to as pilot cutback. The second spool 508 is positioned in the second fuel nozzle valve 416 to allow fuel flow through the main fuel inlet port 502 and on to the main nozzle 59. The second spool 508 is also positioned in the second fuel nozzle valve 416 to block fuel flow through the supplemental pilot inlet port 500 and on to the supplemental pilot outlet port 504 and eventually to the pilot nozzle 58. The first spool 514 in the first fuel nozzle valve 415 is positioned to allow fuel flow directly from the single fuel signal manifold 16 through the cutback orifice 524 and through the pilot fuel inlet port 510 and on to the pilot nozzle 58. Thus, the pilot nozzle 58 does not get the fullest possible fuel flow the system 8 is capable of.

The exemplary embodiment of the fuel injector 10, illustrated in FIGS. 5 and 6, has a fuel nozzle assembly 12 (more than one radially spaced apart nozzle assemblies may be used) that includes the pilot and main nozzles 58 and 59, respectively, for directing fuel into the combustion zone of a combustion chamber of a gas turbine engine. The fuel injector 10 includes a nozzle mount or flange 30 adapted to be fixed and sealed to the combustor casing 26. A hollow stem 32 is integral with or fixed to the flange 30 (such as by brazing or welding) and supports the fuel nozzle assembly 12 and the mixer assembly 40.

Figure 8:
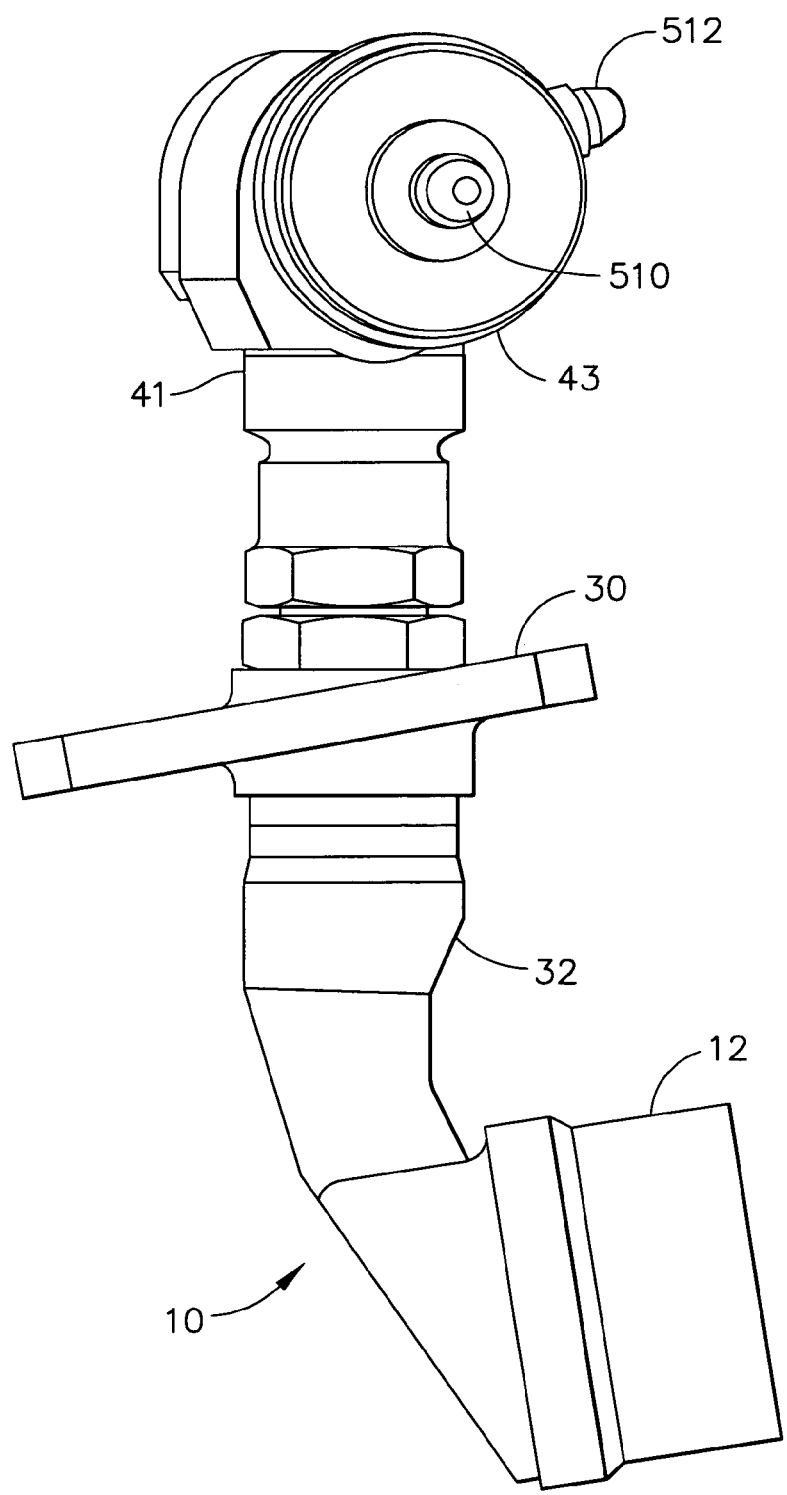
FIG. 8 is a perspective view illustration of the fuel injector illustrated in FIG. 6.

Referring to FIGS. 6 and 8, the hollow stem 32 has an inlet assembly 41 disposed above or within an open upper end of a chamber 39 and is integral with or fixed to flange 30 such as by brazing. Inlet assembly 41 is part of the valve housing 43 with the hollow stem 32 depending from the housing. The housing 43 includes a single fuel supply connector 484 for connecting the single fuel supply manifold 409 to the first, second, and third fuel nozzle valves 415, 416, and 480. The housing 43 further includes a single fuel signal connector 486 for connecting the single fuel signal manifold 16 to the first, second, and third fuel nozzle valves 415, 416, and 480 which are illustrated schematically in FIGS. 2 and 11.

The inlet assembly 41 is operable to receive fuel for combustion and signal pressure for cracking open the nozzle valves from the fuel supply manifold 409 and the fuel signal manifold 16, respectively. The first, second, and third fuel nozzle valves 415, 416, and 480 control fuel flow through the main nozzle first and second fuel circuits 280 and 282 for feeding the main nozzle fuel circuits 102 lead to spray orifices 106. The second fuel injection points 414 of the second staged fuel injection circuits 412 are tip orifices 55 in a fuel injector tips 57 of pilot nozzles 58 of the fuel injectors 10 as illustrated in FIGS. 6 and 7.

The nozzle assembly 12 includes the pilot and main nozzles 58 and 59, respectively. Generally, the pilot and main nozzles 58 and 59 are used during normal and extreme power situations, while only the pilot nozzle is used during start-up and part power operation. A flexible fuel injector conduit 60 having at least one elongated feed strip 62 is used to provide fuel from the inlet assembly 41 to the nozzle assembly 12. The feed strip 62 is a flexible feed strip formed from a material which can be exposed to combustor temperatures in the combustion chamber without being adversely affected.

Figure 9:
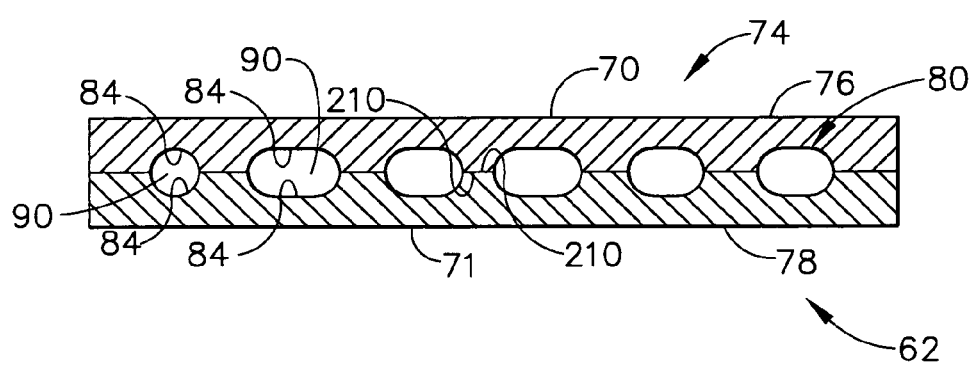
FIG. 9 is a cross-sectional view illustration of the fuel strip taken though 9—9 illustrated in FIG. 6.
Figure 10:
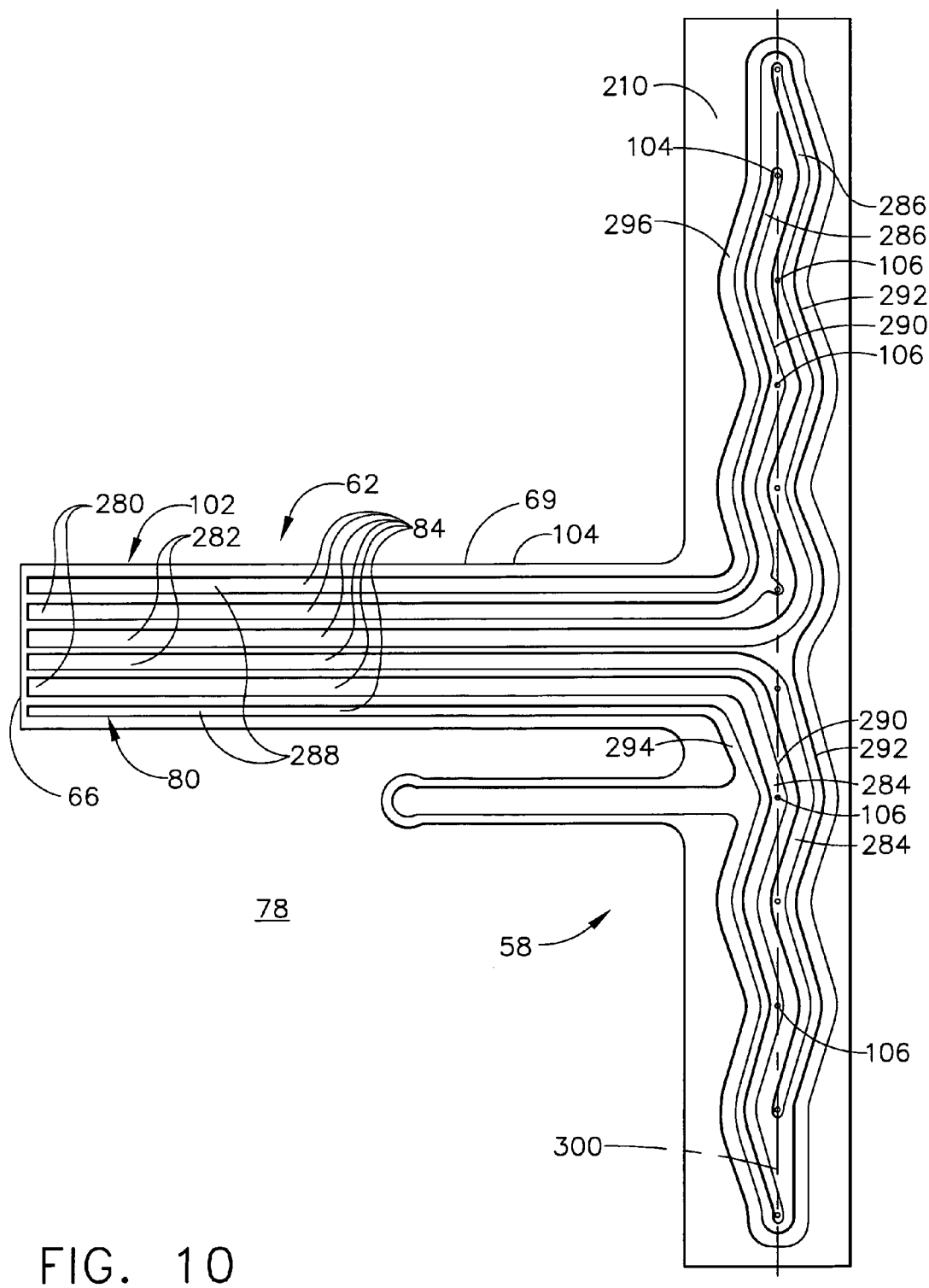
FIG. 10 is a top view illustration of a plate used to form the fuel strip illustrated in FIG. 5.

Referring to FIGS. 9 and 10, the feed strip 62 has a bonded together pair of lengthwise extending first and second plates 76 and 78. Each of the first and second plates 76 and 78 has a single row 80 of widthwise spaced apart and lengthwise extending parallel grooves 84. The plates are bonded together such that opposing grooves 84 in each of the plates are aligned forming internal fuel flow passages 90 through the feed strip 62 from an inlet end 66 to an outlet end 69 of the feed strip 62. A pilot nozzle extension 54 extends aftwardly from the main nozzle 59 and is fluidly connected to a fuel injector tip 57 of the pilot nozzle 58 by the pilot feed tube 56 as further illustrated in FIGS. 6 and 7. The fuel injector tip 57 has a tip orifice 55 that is a fuel injection point of the pilot fuel circuit 288. The pilot fuel circuit 288, the main nozzle first fuel circuit 280, and the main nozzle second fuel circuit 282 are formed by the internal fuel flow passages 90 through the feed strip 62. The feed strip 62 feeds the main nozzle 59 and the pilot nozzle 58 as illustrated in FIGS. 6 and 7.

Referring to FIG. 6, the feed strip 62 has a substantially straight radially extending middle portion 64 between the inlet end 66 and the outlet end 69. A straight header 104 of the fuel injector conduit 60 extends transversely (in an axially aftwardly direction) away from the outlet end 69 of the middle portion 64 and leads to an annular main nozzle 59 which is secured, thus, preventing deflection. The inlet end 66 is fixed within the valve housing 43. The header 104 is generally parallel to the nozzle axis 52 and leads to the main nozzle 59. The feed strip 62 has an elongated essentially flat shape with substantially parallel first and second side surfaces 70 and 71 and a rectangular cross-sectional shape 74 as illustrated in FIG. 9.

Figure 11:
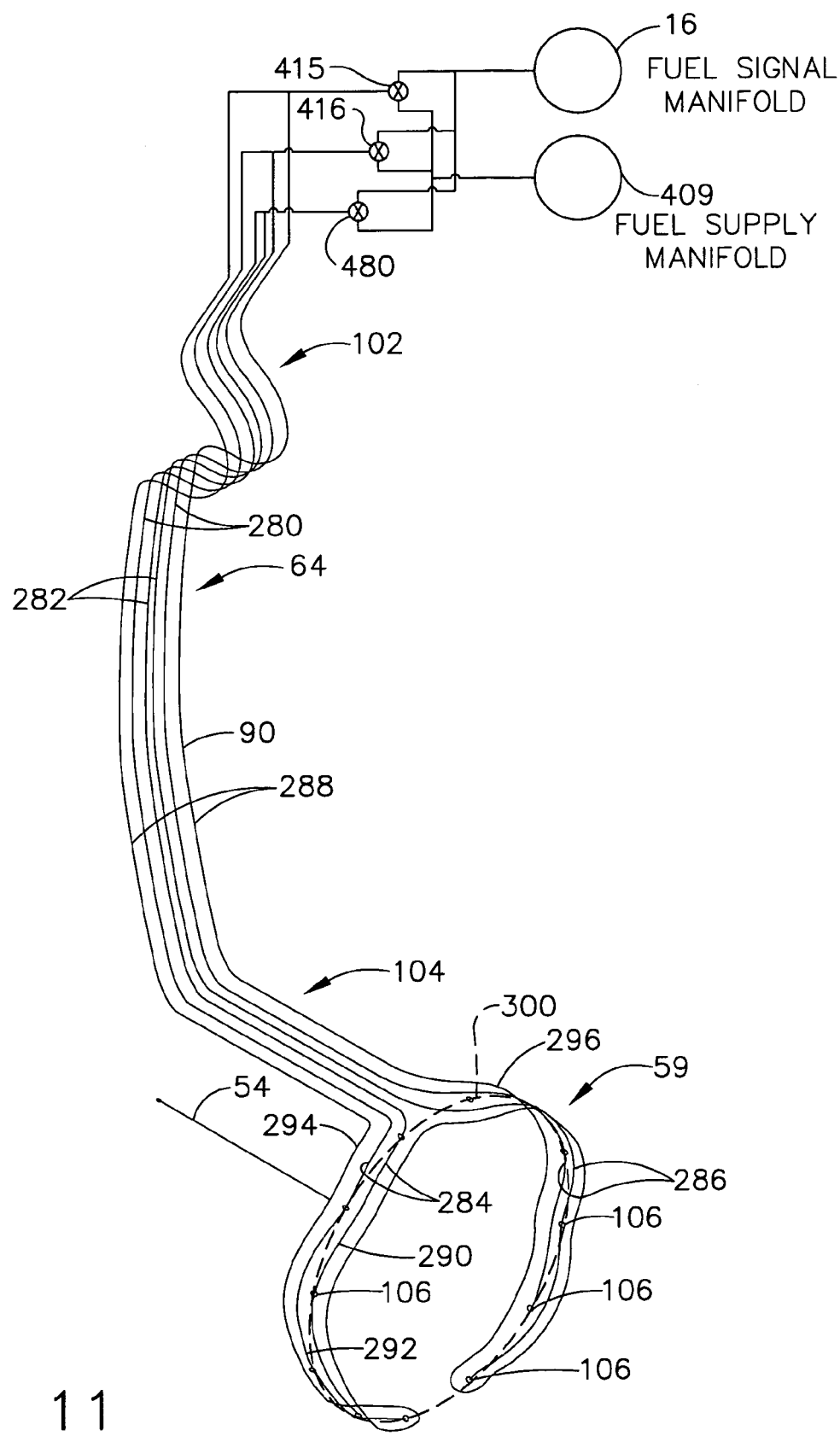
FIG. 11 is a schematic illustration of fuel circuits of the fuel injector illustrated in FIG. 5.
Figure 12:
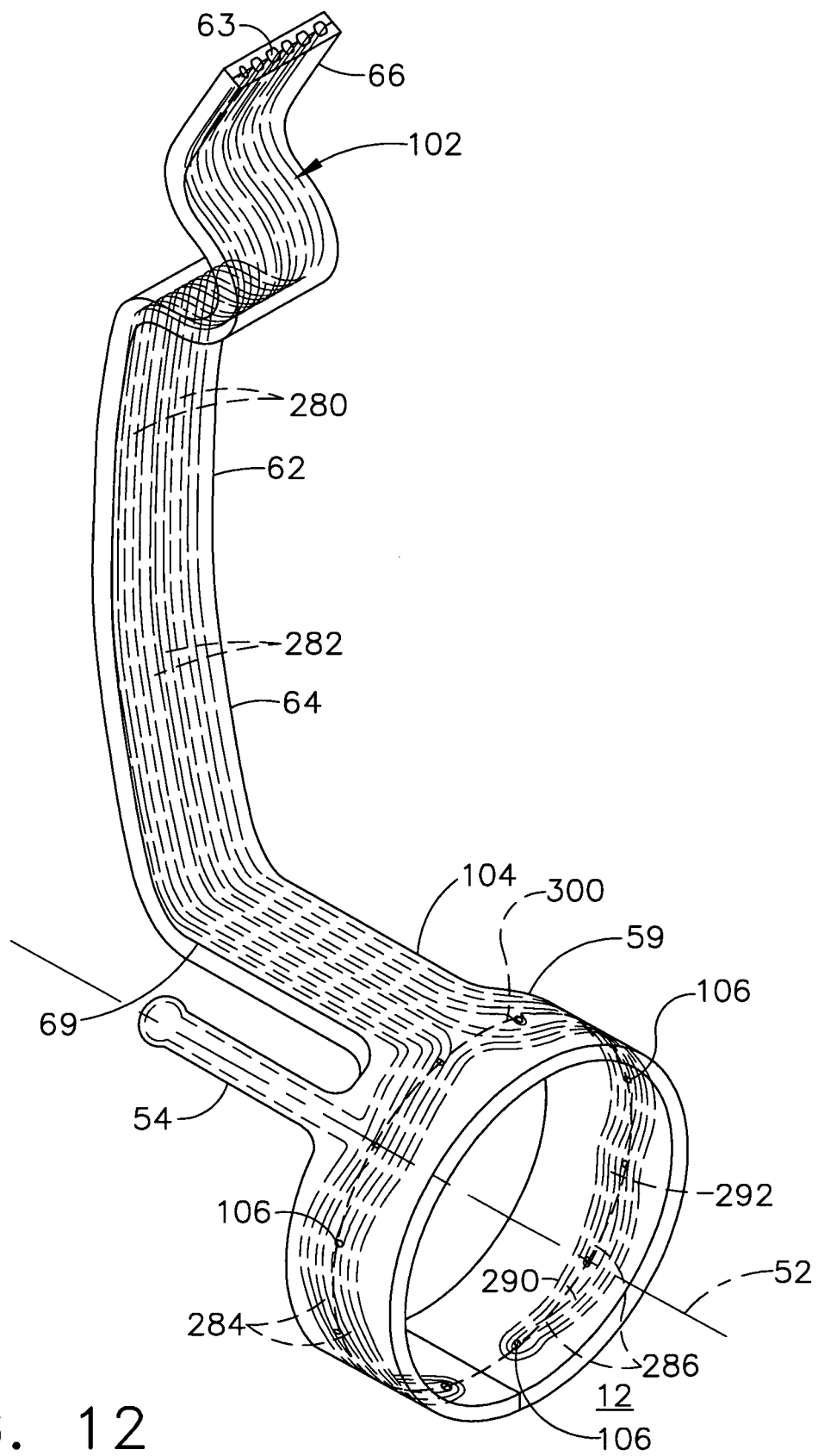
FIG. 12 is a perspective view illustration of the fuel strip with the fuel circuits illustrated in FIG. 11.

Referring to FIGS. 6 and 12, the inlets 63 at the inlet end 66 of the feed strip 62 are in fluid flow communication with or fluidly connected to first and second fuel inlet ports 46 and 47, respectively, in the inlet assembly 41 to direct fuel into the main nozzle fuel circuit 102 and the pilot fuel circuit 288. The inlet ports feed the multiple internal fuel flow passages 90 in the feed strip 62 to the pilot nozzle 58 and main nozzle 59 in the nozzle assembly 12 as well as provide cooling circuits for thermal control in the nozzle assembly. The header 104 of the nozzle assembly 12 receives fuel from the feed strip 62 and conveys the fuel to the main nozzle 59 and, where incorporated, to the pilot nozzle 58 through the main nozzle fuel circuits 102 as illustrated in FIGS. 11 and 12.

The feed strip 62, the main nozzle 59, and the header 104 therebetween are integrally constructed from the lengthwise extending first and second plates 76 and 78. The main nozzle 59 and the header 104 may be considered to be elements of the feed strip 62. The fuel flow passages 90 of the main nozzle fuel circuits 102 run through the feed strip 62, the header 104, and the main nozzle 59. The fuel passages 90 of the main nozzle fuel circuits 102 lead to spray orifices 106 and through the pilot nozzle extension 54 which is operable to be fluidly connected to the pilot feed tube 56 to feed the pilot nozzle 58 as illustrated in FIGS. 5, 6, and 12. The parallel grooves 84 of the fuel flow passages 90 of the main nozzle fuel circuits 102 are etched into adjacent surfaces 210 of the first and second plates 76 and 78 as illustrated in FIGS. 9 and 10.

Referring to FIGS. 9–12, the main nozzle first and second fuel circuits 280 and 282 each include clockwise and counterclockwise extending annular legs 284 and 286, respectively, in the main nozzle 59. The spray orifices 106 extend from the annular legs 284 and 286 through one or both of the first and second plates 76 and 78. The spray orifices 106 radially extend outwardly through the first plate 76 of the main nozzle 59 which is the radially outer one of the first and second plates 76 and 78. The clockwise and counterclockwise extending annular legs 284 and 286 have parallel first and second waves 290 and 292, respectively. The spray orifices 106 are located in alternating ones of the first and second waves 290 and 292 so as to be substantially circularly aligned along a circle 300. The first and second fuel nozzle valves 415 and 416 control fuel to the clockwise and counterclockwise extending annular legs 284 and 286 in the main nozzle first and second fuel circuits 280 and 282 in the main nozzle 59. Thus, the spray orifices 106 in one of the first and second waves 290 and 292 may be shutoff while the spray orifices 106 in the other one of the first and second waves 290 and 292 can be left spraying fuel so that only every other one or alternating ones of the spray orifices 106 around the circle 300 are supplying fuel for combustion. The main nozzle fuel circuits 102 also include a looped pilot fuel circuit 288 which feeds the pilot nozzle extension 54. The looped pilot fuel circuit 288 includes clockwise and counterclockwise extending annular pilot legs 294 and 296, respectively, in the main nozzle 59. See U.S. Pat. No. 6,321,541 for information on nozzle assemblies and fuel circuits between bonded plates.

Referring to FIGS. 11 and 12, the internal fuel flow passages 90 down the length of the feed strips 62 are used to feed fuel to the main nozzle fuel circuits 102. Fuel going into each of the internal fuel flow passages 90 in the feed strips 62 and the header 104 into the pilot and main nozzles 58 and 59 is controlled by the first, second, and third fuel nozzle valves 415, 416, and 480. The header 104 of the nozzle assembly 12 receives fuel from the feed strips 62 and conveys the fuel to the main nozzle 59. The main nozzle 59 is annular and has a cylindrical shape or configuration.

Referring to FIGS. 9 and 10, the flow passages, openings and various components of the spray devices in plates 76 and 78 can be formed in any appropriate manner such as by etching and, more specifically, chemical etching. The chemical etching of such plates should be known to those skilled in the art and is described for example in U.S. Pat. No. 5,435,884. The etching of the plates allows the forming of very fine, well-defined, and complex openings and passages, which allow multiple fuel circuits to be provided in the feed strips 62 and main nozzle 59 while maintaining a small cross-section for these components. The plates 76 and 78 can be bonded together in surface-to-surface contact with a bonding process such as brazing or diffusion bonding. Such bonding processes are well-known to those skilled in the art and provides a very secure connection between the various plates. Diffusion bonding is particularly useful as it causes boundary cross-over (atom interchange) between the adjacent layers.

Referring to FIGS. 5 and 7, each mixer assembly 40 includes a pilot mixer 142, a main mixer 144, and a centerbody 143 extending therebetween. The centerbody 143 defines a chamber 150 that is in flow communication with, and downstream from, the pilot mixer 142. The pilot nozzle 58 is supported by the centerbody 143 within the chamber 150. The pilot nozzle 58 is designed for spraying droplets of fuel downstream into the chamber 150. The main mixer 144 includes main axial swirlers 180 located upstream of main radial swirlers 182 located upstream from the spray orifices 106. The pilot mixer 142 includes a pair of concentrically mounted pilot swirlers 160. The pilot swirlers 160 are illustrated as axial swirlers and include an inner pilot swirler 162 and an outer pilot swirler 164. The inner pilot swirler 162 is annular and is circumferentially disposed around the pilot nozzle 58. Each of the inner and outer pilot swirlers 162 and 164 includes a plurality of inner and outer pilot swirling vanes 166 and 168, respectively, positioned upstream from pilot nozzle 58.

Referring more particularly to FIG. 7, an annular pilot splitter 170 is radially disposed between the inner and outer pilot swirlers 162 and 164 and extends downstream from the inner and outer pilot swirlers 162 and 164. The pilot splitter 170 is designed to separate pilot mixer airflow 154 traveling through inner pilot swirler 162 from airflow flowing through the outer pilot swirler 164. Splitter 170 has a converging-diverging inner surface 174 which provides a fuel-filming surface during engine low power operations. The splitter 170 also reduces axial velocities of the pilot mixer airflow 154 flowing through the pilot mixer 142 to allow recirculation of hot gases. The inner pilot swirler vanes 166 may be arranged to swirl air flowing therethrough in the same direction as air flowing through the outer pilot swirler vanes 168 or in a first circumferential direction that is opposite a second circumferential direction that the outer pilot swirler vanes 168 swirl air flowing therethrough.

Referring more particularly to FIG. 5, the main mixer 144 includes an annular main nozzle housing 190 that defines an annular cavity 192. The main mixer 144 is a radial inflow mixer concentrically aligned with respect to the pilot mixer 142 and extends circumferentially around the pilot mixer 142. The main mixer 144 produces a swirled main mixer airflow 156 along the nozzle housing 190. The annular main nozzle 59 is circumferentially disposed between the pilot mixer 142 and the main mixer 144. More specifically, main nozzle 59 extends circumferentially around the pilot mixer 142 and is radially located outwardly of the centerbody 143 and is within the annular cavity 192 of the nozzle housing 190.

Referring more particularly to FIG. 7, the nozzle housing 190 includes spray wells 220 through which fuel is injected from the spray orifices 106 of the main nozzle 59 into the main mixer airflow 156. Annular radially inner and outer heat shields 194 and 196 are radially located between the main nozzle 59 and an outer annular nozzle wall 172 of the nozzle housing 190. The inner and outer heat shields 194 and 196 includes radially inner and outer walls 202 and 204, respectively, and there is a 360 degree annular gap 200 therebetween. The inner and outer heat shields 194 and 196 each include a plurality of openings 206 aligned with the spray orifices 106 and the spray wells 220. The inner and outer heat shields 194 and 196 are fixed to the stem 32 in an appropriate manner, such as by welding or brazing.

The main nozzle 59 and the spray orifices 106 inject fuel radially outwardly into the cavity 192 though the openings 206 in the inner and outer heat shields 194 and 196. An annular slip joint seal 208 is disposed in each set of the openings 206 in the inner heat shield 194 aligned with each one of the spray orifices 106 to prevent cross-flow through the annular gap 200. The annular slip joint seal 208 may be attached to the inner wall 202 of the inner heat shield 194 by a braze or other method.

See U.S. patent application Ser. Nos. 10/161,911, entitled "FUEL INJECTOR LAMINATED FUEL STRIP", filed Jun. 4, 2002; Ser. No. 10/422,265 entitled "DIFFERENTIAL PRESSURE INDUCED PURGING FUEL INJECTOR WITH ASYMMETRIC CYCLONE", filed Apr. 24, 2003; and Ser. No. 10/356,009, entitled "COOLED PURGING FUEL INJECTORS", filed Jan. 31, 2003 for background information on nozzle assemblies and fuel circuits between bonded plates.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A fuel injector comprising:
   a valve housing,
   a hollow stem depending from the housing,
   at least one fuel nozzle assembly supported by the stem,
   at least first and second staged fuel injection circuits in the fuel injector,
   each of the first and second staged fuel injection circuits having first and second fuel injection points,
   at least first and second fuel nozzle valves controllably connected to the first and second staged fuel injection circuits respectively,
   the first and second fuel nozzle valves being operable to open at different first and second crack open pressures respectively,
   the housing including a single fuel supply connector connected in fuel supply relationship with the first and second fuel nozzle valves and a single fuel signal connector connected in pressure supply relationship with the first and second fuel nozzle valves.

2. A fuel injector as claimed in claim 1 further comprising the first injection point of the first staged fuel injection circuit being a tip orifice in a fuel injector tip of a pilot nozzle of the fuel injector and the second fuel injection points of the second staged fuel injection circuits located in a main nozzle of each of the fuel injectors.

3. A fuel injector as claimed in claim 2 wherein the main nozzle is annular and has radially extending spray orifices located at the second staged fuel injection circuits.

4. A fuel injector as claimed in claim 3 further comprising:
   internal fuel flow passages of the first and second staged fuel injection circuits extending through the annular main nozzle,
   clockwise and counterclockwise extending annular legs extending circumferentially from at least a first one of the internal fuel flow passages through the main nozzle, and
   the first injection points of the first staged fuel injection circuits located at spray orifices extending from the annular legs through at least one of the plates.

5. A fuel injector as claimed in claim 4 wherein the annular legs have waves.

6. A fuel injector as claimed in claim 5 wherein the waves are parallel.

7. A fuel injector as claimed in claim 6 wherein the spray orifices are located in alternating ones of the first and second waves so as to be substantially aligned along a circle.

8. A fuel injector as claimed in claim 2 further comprising:
   the first and second staged fuel injection circuits extending at least in part through a fuel injector conduit,
   the fuel injector conduit extending between the housing through the stem to the nozzle assembly,
   the fuel injector conduit comprising at least one feed strip having at least one bonded together pair of lengthwise extending plates,
   each of the plates having widthwise spaced apart and lengthwise extending parallel grooves, and
   the plates being bonded together such that opposing grooves in each of the plates are aligned forming internal fuel flow passages of the first and second staged fuel injection circuits through the length of the strip from an inlet end to an outlet end.

9. A fuel injector as claimed in claim 8 further comprising:
   the internal fuel flow passages extending through the feed strip and the annular main nozzle,
   clockwise and counterclockwise extending annular legs extending circumferentially from at least a first one of the internal fuel flow passages through the main nozzle, and
   the first injection points of the first staged fuel injection circuits located at spray orifices extending from the annular legs through at least one of the plates.

10. A fuel injector as claimed in claim 9 wherein the annular legs have waves.

11. A fuel injector as claimed in claim 10 wherein the waves are parallel.

12. A fuel injector as claimed in claim 11 wherein the spray orifices are located in alternating ones of the first and second waves so as to be substantially aligned along a circle.

13. A fuel injector comprising:
   a valve housing,
   a hollow stem depending from the housing,
   at least one fuel nozzle assembly supported by the stem,
   first, second, and third staged fuel injection circuits in the fuel injector,
   the first, second, and third staged fuel injection circuits extending at least in part through a fuel injector conduit,
   the fuel injector conduit extending between the housing through the stem to the nozzle assembly, each of the first, second, and third staged fuel injection circuits having first, second, and third fuel injection points, first, second, and third fuel nozzle valves controllably connected to the first, second, and third staged fuel injection circuits respectively, the first, second, and third fuel nozzle valves being operable to open at different first, second, and third crack open pressures respectively, the housing including a single fuel supply connector connected in fuel supply relationship with the first and second fuel nozzle valves and a single fuel signal connector connected in pressure supply relationship with the first and second fuel nozzle valves, the fuel injector conduit comprising a single feed strip having a single bonded together pair of lengthwise extending plates, each of the plates having widthwise spaced apart and lengthwise extending parallel grooves, and the plates being bonded together such that opposing grooves in each of the plates are aligned forming internal fuel flow passages of the first, second, and third staged fuel injection circuits through the length of the strip from an inlet end to an outlet end.

14. A fuel injector as claimed in claim 13 further comprising:

the first staged fuel injection circuit being a pilot fuel circuit in an annular main nozzle, the second staged fuel injection circuit being a main nozzle first fuel circuit in the main nozzle, and the third staged fuel injection circuit being a main nozzle second fuel circuit in the main nozzle.

15. A fuel injector as claimed in claim 14 further comprising:

the first fuel injection points of the first staged fuel injection circuits are tip orifices in fuel injector tips of pilot nozzles of the fuel injectors, and the second and third fuel injection points are spray orifices in main nozzle first and second fuel circuits respectively in the main nozzles of the fuel injectors.

16. A fuel injector as claimed in claim 15 further comprising further comprising the main nozzle fluidly connected to the outlet end of the feed strip and integrally formed with the feed strip from the bonded together pair of lengthwise extending plates.

17. A fuel injector as claimed in claim 16 further comprising:

clockwise and counterclockwise extending annular legs extending circumferentially from at least one of the internal fuel flow passages in each of the main nozzle first and second fuel circuits in the annular main nozzle, the clockwise and counterclockwise extending annular legs of the main nozzle first and second fuel circuits having parallel first and second waves respectively, and the spray orifices are located in alternating ones of the first and second waves so as to be substantially aligned along a circle.

* * * * *